(12) United States Patent
Negeri

(10) Patent No.: US 11,128,520 B2
(45) Date of Patent: Sep. 21, 2021

(54) SYSTEM AND METHOD FOR REAL-TIME NETWORK ENGINEERING CONTROL

(71) Applicant: Tata Communications Transformation Services (US) Inc., Dover, DE (US)

(72) Inventor: Asfaw Negeri, Plano, TX (US)

(73) Assignee: Tata Communications Transformation Services (US) Inc., Dover, DE (US)

(*) Notice: Subject to any disclaimer, the term of this patent is extended or adjusted under 35 U.S.C. 154(b) by 0 days.

(21) Appl. No.: 16/555,394

(22) Filed: Aug. 29, 2019

(65) Prior Publication Data

US 2020/0076674 A1   Mar. 5, 2020

Related U.S. Application Data

(60) Provisional application No. 62/725,566, filed on Aug. 31, 2018.

(51) Int. Cl.
*G06F 15/173* (2006.01)
*H04L 12/24* (2006.01)

(52) U.S. Cl.
CPC .......... *H04L 41/046* (2013.01); *H04L 41/065* (2013.01); *H04L 41/0631* (2013.01); *H04L 41/0893* (2013.01); *H04L 41/12* (2013.01); *H04L 41/14* (2013.01)

(58) Field of Classification Search
CPC ... H04L 41/046; H04L 41/0631; H04L 41/12; H04L 41/0893; H04L 41/065; H04L 41/14; H04L 41/0654; H04L 12/24
See application file for complete search history.

(56) References Cited

U.S. PATENT DOCUMENTS

| | | | | |
|---|---|---|---|---|
| 7,664,492 B1* | 2/2010 | Lee | ........................ | H04W 16/28 455/424 |
| 8,676,956 B1* | 3/2014 | Johnson | ............... | H04J 14/0272 709/224 |
| 9,619,315 B1* | 4/2017 | Brissette | ............... | H04L 41/046 |
| 2004/0024859 A1* | 2/2004 | Bloch | ..................... | H04L 41/20 709/223 |
| 2017/0208077 A1* | 7/2017 | Freedman | ........... | G06F 16/2471 |
| 2018/0278480 A1* | 9/2018 | Prasad | ................ | H04L 41/0856 |
| 2020/0007405 A1* | 1/2020 | Chitalia | .................. | H04L 41/14 |

* cited by examiner

*Primary Examiner* — Cheikh T Ndiaye
(74) *Attorney, Agent, or Firm* — Kaplan Breyer Schwarz, LLP

(57) ABSTRACT

A system for providing real-time network engineering control for a network system is provided that includes an agent module for constructing and sending data queries to one or more client modules installed on the network system. The client module evaluates the query from the agent module, retrieves and structures the requested data and sends the structured requested data back to the agent module. The agent module then sends the requested data to at least one engineering control module that analyzes the requested data and responds based on the evaluation of the requested data.

18 Claims, 10 Drawing Sheets

| NW-1 | VoLTE | VM-1 | 99.999% | 80% | 80% | 100 ms |
|------|-------|------|---------|-----|-----|--------|
| NW-2 | Internet | VM-1 | 99.9% | 85% | 85% | 250ms |

FIG. 4

SYSTEM AND METHOD FOR REAL-TIME NETWORK ENGINEERING CONTROL

STATEMENT OF RELATED CASES

This application claims priority to U.S. Provisional Application Ser. No. 62/725,566, filed Aug. 31, 2018, whose entire disclosure is incorporated herein by reference.

FIELD OF THE INVENTION

The present invention relates to network engineering technology and, more particularly, to real-time network engineering decision making systems and methods.

BACKGROUND OF THE INVENTION

Network Engineering covers a wide range of activities in different areas in telecommunication networks. The following are examples of some of the major areas covered under Network Engineering today: System Limitation & gap identification/Analysis; End-to-End Network modeling; Root Cause Analysis; Vendor Management; Network Management; Network Dimensioning; Bill of Materials (BOM) Creation; Equipment Ordering & Tracking Management Radio Access Network (RAN); Backhaul; Transport; and Core.

Most network engineering is done manually (usually based on forecasts) and in silos. Consequently, there are too many tools (different tools for different network components) and such tools are not integrated. There is no unified network engineering system addresses effective end-to-end network engineering. Additionally, there is no real-time feedback for quick decision making in network engineering, because of the time it takes to parse and present unstructured data for network monitoring decisions.

Thus, there is a need for real-time network engineering decision making systems and methods, as well as a need for network engineering modularity and automation mechanisms that associate all network components and service resource utilization. There is also a need for novel, efficient data query and response mechanisms that minimize the bandwidth required between different data sources, minimize duplicate data storage requirements, and quickly convert unstructured data into structured data. Furthermore, there is a need for server and client agents that are able to reside on any type of network component in various types of external networks, such as cloud networks, virtualized networks, internet of things networks, and mobile networks and fixed networks.

SUMMARY OF THE INVENTION

An object of the invention is to solve at least the above problems and/or disadvantages and to provide at least the advantages described hereinafter.

The present invention provides a system for providing real-time network engineering control of an external network. The system includes at least one engineering control module, as well as a data collection system that preferably includes an agent module for constructing and sending data queries to a client module installed on the external network, and a client module that evaluates the query from the agent module, retrieves and structures the requested data and sends the structured requested data back to the agent module. The agent module then sends structured requested data to the at least one engineering control module, which analyzes the structured requested data and responds based on the evaluation of the structured requested data.

To achieve at least the above objects, in whole or in part, there is provided an engineering control system for a network system, comprising a first processor; an agent module comprising a set of computer readable instructions that are executable by the first processor to generate a network data query and send the network data query to a network system; a second processor associated with the network system; a client module comprising a set of computer readable instructions that are executable by the at least second processor to: receive the network data query from the agent module, retrieve network data requested by the data query from the network system, organize the retrieved network data into a predetermined format to yield structured network data, and send the structured network data to the agent module; and at least one engineering control module comprising a set of computer readable instructions executable by the first processor to: receive the structured network data from the agent module, analyze the structured network data, and generate a response based on the analysis of the structure network data.

To achieve at least the above objects, in whole or in part, there is also provided An engineering control system for a network system, comprising: a first processor; an agent module comprising a set of computer readable instructions that are executable by the first processor to generate a network data query and send the network data query to a network system; a second processor associated with the network system; a client module comprising a set of computer readable instructions that are executable by the at least second processor to: receive the network data query from the agent module, retrieve network data requested by the data query from the network system, organize the retrieved network data into a predetermined format to yield structured network data, and send the structured network data to the agent module; an engineering root cause analysis control ("E-RCAC") module, wherein the E-RCAC module comprises a set of computer readable instructions executable by the first processor to: analyze the structured network data to determine a root cause of one or more issues in the network system, and communicate with external systems to address the root cause of the one or more issues in the network system; an engineering policy control module comprising a set of computer readable instructions that are executable by the first processor to: maintain and validate network service policies and dimensioning policies that apply to the network system, provide configurable time intervals for sending data queries via the agent module, receive the structured network data from the agent module, evaluate the structured network data received from the agent module, and send the results of the evaluation of the structured data to the E-RCAC module; a resource engineering control module comprising a set of computer readable instructions that are executable by the first processor to maintain and provide dimensioning and architecture information for the network system; and a bill of materials analytics module comprising a set of computer readable instructions that are executable by the first processor to maintain bill of materials information for the network system.

BRIEF DESCRIPTION OF THE DRAWINGS

The invention will be described in detail with reference to the following drawings in which like reference numerals refer to like elements wherein:

FIG. 4 is a table showing examples of service policies that may be maintained and validated by the E-PC module, in accordance with an exemplary embodiment of the present invention;

DETAILED DESCRIPTION OF PREFERRED EMBODIMENTS

Figure 1:
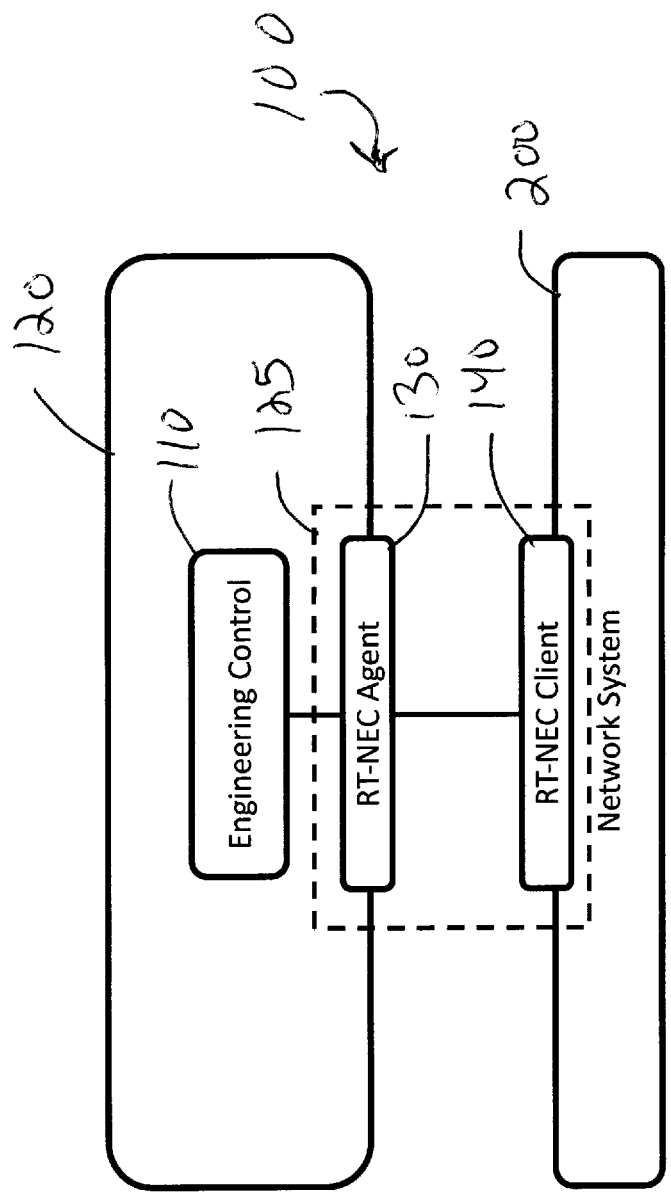
FIG. 1 is block diagram of a real-time network engineering control (RT-NEC) system, in accordance with one exemplary embodiment of the present invention.

The following description merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known structures and techniques have not been shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure. In addition, it will be appreciated by those skilled in the art that any flow charts, flow diagrams, state transition diagrams, pseudocode, and the like represent various processes which may be substantially represented in a computer readable medium and so executed by a computer or processor, whether or not such computer or processor is explicitly shown.

In the claims hereof any element expressed as a means for performing a specified function is intended to encompass any way of performing that function including, for example: a) a combination of circuit elements which performs that function; or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

The term "module" as used herein means a real-world device, component, or arrangement of components implemented using hardware, which may include an application specific integrated circuit (ASIC) or field-programmable gate array (FPGA), for example, or a microprocessor system and a set of computer readable instructions to implement the module's functionality, which (while being executed) transform the microprocessor system into a special-purpose device for carrying out the module's functions.

A module can also be implemented as a combination of hardware alone and software-controlled hardware, with certain functions facilitated by the hardware alone, and other functions facilitated by a combination of hardware and software. In certain implementations, at least a portion, and in some cases, all, of a module can be executed on the processor(s) of a computer or device (such as, for example, a server and a client device) that executes an operating system, system programs, and application programs, while also implementing the module using multitasking, multi-threading, distributed (e.g., cloud) processing, or other such techniques. Examples of such a computer or device include, but are not limited to, a personal computer (e.g., a desktop computer or a notebook computer), a server, an automated teller machine (ATM), a point-of-sale terminal, an appliance, and a mobile computing device, such as a smartphone, a tablet, or a personal digital assistant (PDA). Further, a server is suitably any type of server, such as a Windows server, Linux server, Unix server or the like.

The acronyms defined below may be used herein:
BOMA: Bill of Material Analytics
BOM: Bill of Materials
DC: Data Center
DCF: Data Center Facility
E-PC: Engineering Policy Control
E-RCAC: Engineering RCA Control
EMS: Element Management System
IoT: Internet of Things
IP: Internet Protocols
IPMS: Ip Multimedia Subsystem
IMS: Inventory Management System
NMS: Network Management System
QoS: Quality of Service
RCA: Root Cause Analysis
REC: Resource Engineering Control
RT-NEC: Real-Time Network Engineering Control
RT-NEC Agent Module: Real-Time Network Engineering Control Agent Module
RT-NEC Client Module: Real-Time Network Engineering Control Client Module FIG. 1 is block diagram of a real-time network engineering control ("RT-NEC") system 100, in accordance with one exemplary embodiment of the present invention. The RT-NEC system 100 provides engineering control for a network system 200, and includes at least one engineering control module 110 implemented on one or more processors, such as a server 120, and a data collection system 125 that collects data from one or more network elements in the network system 200. The data collection system 125 preferably includes an RT-NEC agent module 130 implemented on server 120 and an RT-NEC client module 140 that is implemented on one or more network elements in the network system 200.

The RT-NEC agent module 130 is responsible for constructing data queries, based on one or more predefined policy, and sending the data queries to the RT-NEC client module 140 at predefined time intervals. The RT-NEC client module 140 evaluates the contents of the queries, searches for the requested data in one or more network databases that may be unstructured, compiles the search results in a structured format and sends the compiled requested data to the RT-NEC agent module 130. As used herein, data or a database that is "unstructured" means data that has no pre-defined format such as text files, e-mail messages and audio files that are difficult to collect, process, and analyze. As used herein, a "structured format" means data that is well organized in rows and columns (for example, data organized in spreadsheets) and easily searchable by basic algorithms The RT-NEC agent module 130 receives the structured data from the RT-NEC client module 140 and sends it to the at least one engineering control module 110. The engineering control module 110 analyzes the received data and responds based on the evaluation of the received data. The response could include, for example, an analysis to determine a root cause of one or more issues (e.g., network performance and/or network capacity issues) in the network system 200, requesting additional information if needed to identify a root cause of issues in the network system 200 by interacting with the network system 200 and/or one or more external systems (not shown in FIG. 1), interacting with the network system 200 and/or one or more external systems to address and/or rectify the issues, and/or any other network engineering control actions.

An illustrative example of a query constructed by the RT-NEC agent module 130 in a network management system that incorporates the RT-NEC system 100 of the present invention is: "Search (NW-ID, S-ID, VM-ID, N-ID, mem>80%, CPU>80%)", where:
NW-ID is a network identifier;
S-ID is an service type;
VM-ID is a virtual machine identifier;
N-ID is a network element identifier;
mem>80% means a memory utilization of greater than 80%; and
CPU>80% means a central processing unit utilization of greater than 80%.

The above example of a query instructs the RT-NEC client module 140 to search for and identify network elements in the network system 200 that exhibit a memory utilization of greater than 80% and/or a CPU utilization of greater than 80%. These queries could be constructed in response to a predefined policy in which network elements exhibiting a memory utilization of greater than 80% and/or a CPU utilization of greater than 80% should be reported in order to identify potential issues in the network system 200.

An illustrative example of a response to this query by the RT-NEC client module 140 is the following structured data: (Dallas-1, VoLTE, VM-1, S-CSCF, mem=85%, CPU=90%); (Dallas-1, VoLTE, VM-5, HSS, mem=85%, CPU=90%). This response means the following:

A network element identified by the label "S-CSCF" is exhibiting a memory utilization of 85% and a CPU utilization of 90%. This network element is part of the "Dallas-1" network, the type of service is "VoLTE" (voice over LTE), and is part of virtual machine 1 ("VM-1").

A network element identified by the label "HSS" is exhibiting a memory utilization of 85% and a CPU utilization of 90%. This network element is part of the "Dallas-1" network, the type of service is "VoLTE" (voice over LTE), and is part of virtual machine 5 ("VM-5").

Thus, the response identifies two network elements (HSS and S-CSCF) that exhibit a memory utilization of greater than 80% and/or a CPU utilization of greater than 80%. The RT-NEC agent module 130 sends this structured data to the at least one engineering control module 110. The engineering control module 110 analyzes the structured data and responds based on the evaluation of the structured data.

The server 120 on which the at least one engineering control module 110 and the RT-NEC agent module 130 is implemented, and the one or more network elements of the network system 200 on which the RT-NEC client module 140 is implemented, can each be implemented as one or more computing devices or processors that are configured to implement the functionality described herein. They can each, for example, comprise one or more physical servers, a cloud computing infrastructure and/or other server devices. In embodiments in which the server 120 is implemented by multiple physical computing devices, the computing devices can be co-located in a common location, or can be distributed across multiple physical locations and communicate over a network Similarly, in embodiments in which the one or more network elements of the network system 200 on which the RT-NEC client module 140 is implemented are implemented by multiple physical computing devices, the computing devices can be co-located in a common location, or can be distributed across multiple physical locations and communicate over a network.

Figure 2:
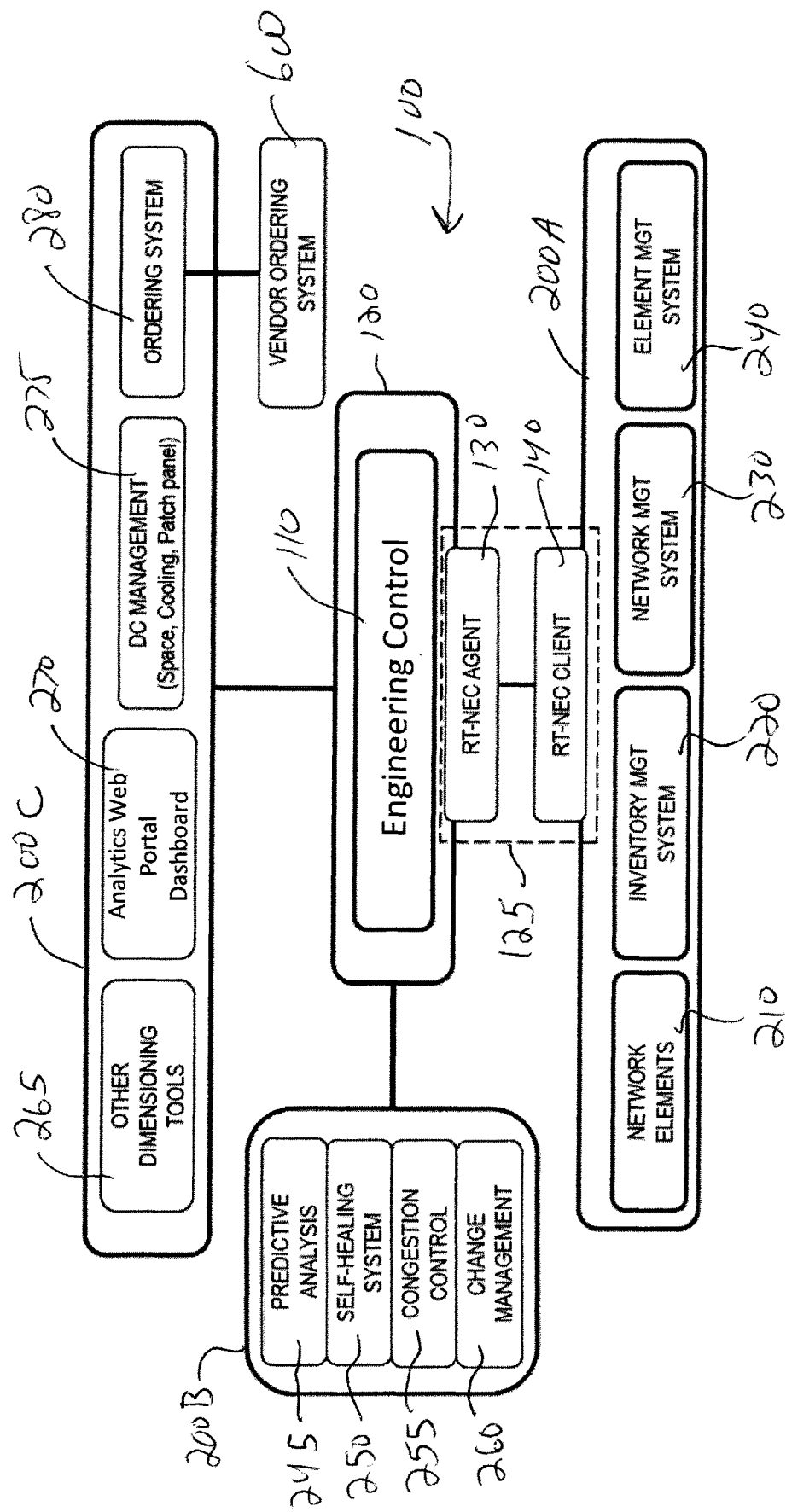
FIG. 2 is a block diagram of a RT-NEC system, in accordance with another exemplary embodiment of the present invention.

FIG. 2 is a block diagram of the RT-NEC system 100 of the present invention, in accordance with another exemplary embodiment of the present invention. In In the embodiment of FIG. 2, the network system 200 includes network subsystems 200A, 200B and 200C. Network subsystem 200A preferably includes networks elements 210, an inventory management system 220, a network management system 230 and an element management system 240. Network elements 210 can include any type of network elements including, but not limited to, IP routers, radio networks, radio core networks, element management systems, network management systems and virtual systems.

The inventory management system 220 is a database that stores all network assets and network information. The network management system 230 is network performance monitoring and management system for network quality analysis. The element management system 240 is a network element or a node performance monitoring and management system for network element/node quality analysis.

Network subsystems 200B and 200C can include, for example, a predictive analytics system 245 that can predict the performance of a network in advance, a self-healing system 250 that can restart and restore the system in fault free state, a congestion control system 255 that can understand the traffic load of the system or network, a change management system 260 that is responsible of managing all changes to product design, implementation and operations through network lifecycle to improve the performance and quality of the network, dimensioning tools 260 that can dimension the network based on traffic capacity and performance parameters, an analytics web portal dashboard 270 that can provide end users access to the system, a data center ("DC") management system 275 where the network infrastructure resides and is managed, and an ordering system 280 that is used to order network element for purchase. The ordering system 280 is used to order required equipment from vendors utilizing the vendor's ordering system 600.

Figure 3:
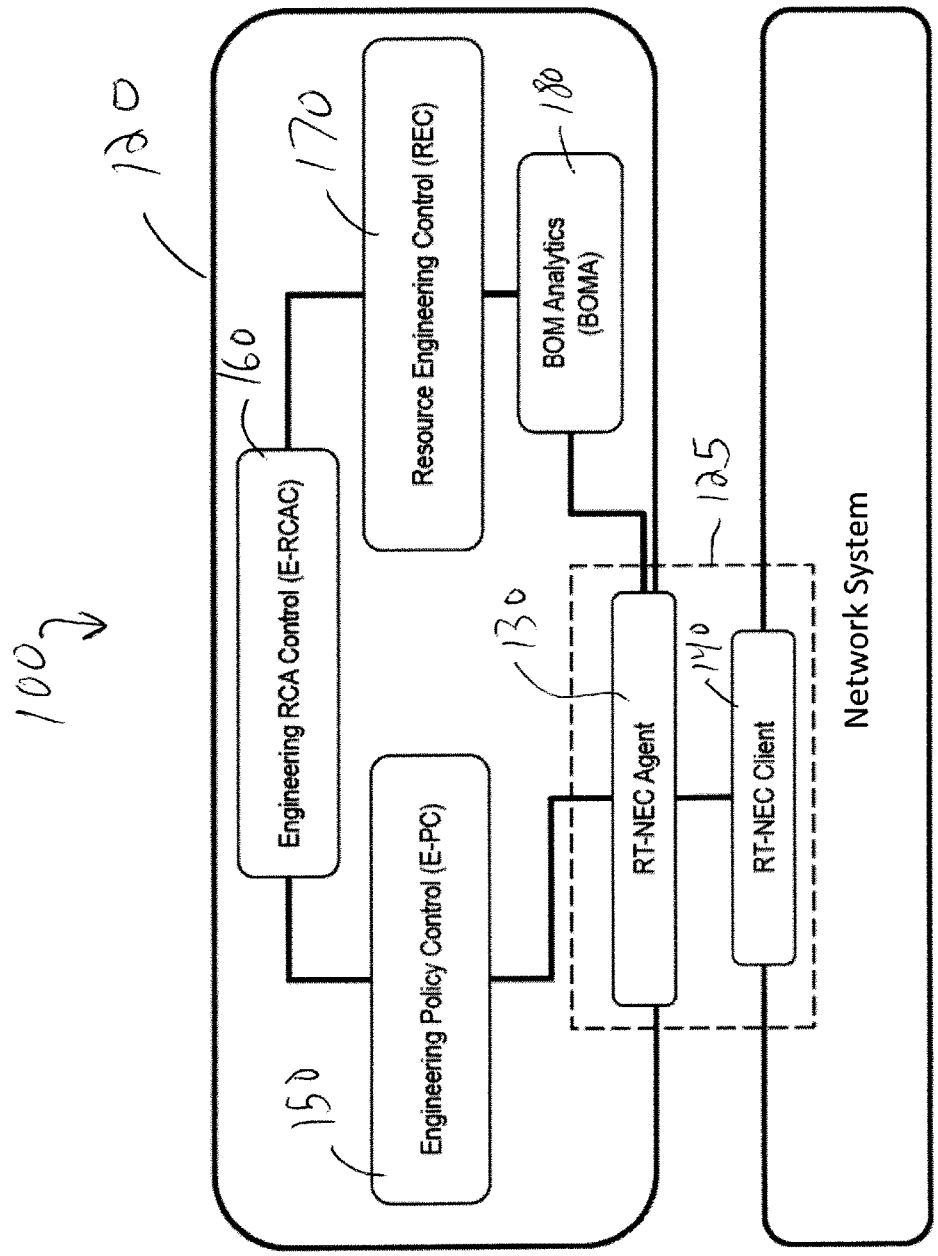
FIG. 3 is block diagram of a RT-NEC system, in accordance with another exemplary embodiment of the present invention.

FIG. 3 is block diagram of a RT-NEC system 100, in accordance with an exemplary embodiment of the present invention. In the system 100 of FIG. 3, the at least one engineering control module 110 includes an engineering policy control ("E-PC") module 150, an engineering root cause control ("E-RCAC") module 160, a resource engineering control ("REC") module 170 and a BOM analytics ("BOMA") module 180.

The E-PC module 150 preferably maintains and validates the network service policies and dimensioning policies that apply to the network system 200, provides a configurable time interval for sending queries via the RT-NEC agent module 130, interacts with and provides information to the E-RCAC module 160, receives structured data from the RT-NEC agent module 130 (which the RT-NEC agent module 130 received from the RT-NEC client module 140 in response to a query), evaluates the structured data received from the RT-NEC agent module 130, and sends the results of the evaluation of the structured data to the E-RCAC module 160 on a priority/critical order basis for analysis.

FIG. 4 is a table showing examples of service policies that may be maintained and validated by the E-PC module 150. In the table shown, there are service polices defined for two networks: (1) network "NW-1"; and (2) network "NW-2".

Network NW-1 is a Voice over LTE (VoLTE) network on virtual machine 1, and the service policy dictates that the network availability should be at least 99.999%, CPU utilization should not exceed 80%, memory utilization should not exceed 80% and latency should not exceed 100 ms. Network NW-2 is an Internet network on virtual machine 1, and the service policy dictates that the network availability should be at least 99.9%, CPU utilization should not exceed 85%, memory utilization should not exceed 85% and latency should not exceed 250 ms.

Referring back to FIG. 3, the E-RCAC module 160 analyzes information received from the E-PC module 150 regarding the structured data and responds based on the analysis of the information from the E-PC module 150. The response could include, for example: (1) an analysis to determine the root cause of issues in the network system 200; (2) requesting additional information, if needed to identify a root cause of issues in the network system 200, by interacting with external systems; (3) communicating with external systems to address and/or rectify any issues with the network system 200; and/or (4) any other network engineering control actions.

The REC module 170 maintains and provides network dimensioning and network architecture information. In one exemplary embodiment, the REC module 170 generates and maintains a network traffic model (e.g., types of services, number of users, quality of service), dimensions network parameters, maintains information regarding network topology and location, suggests network architectures, and provides notifications to data center facility teams.

The BOMA module 180 maintains and provides information regarding BOM information, such as lists of materials and/or equipment used to implement and maintain the network system 200, lists of preferred vendors for the materials and/or equipment used to implement and maintain the network system 200, locations of materials and/or equipment in inventory, etc.). The BOMA module 180 preferably utilizes a RT-NEC agent module 130 residing on server 120 and a RT-NEC client module 140 residing on an inventory management system (such as the inventory management system 220 shown in FIG. 2. In this regard, although a single RT-NEC agent module 130 and a single RT-NEC client module 140 is shown in FIGS. 1, 2 and 3 for illustrative purposes, it should be appreciated that any number of RT-NEC agent modules 130 and RT-NEC client modules 140 may be used to implement the functionality of the RT-NEC system 100 as described herein.

In the case of the BOMA module 180, a RT-NEC agent module 130 residing on server 120 constructs queries that are sent to a RT-NEC client module 140 residing on on an inventory management system 220. Such a query could be, for example, asking the inventory management system 220 if required components for building a new network topology (as determined by the BOMA module 180) already exist in inventory. Such a new network topology may have been recommended by the REC module 170 in response to the E-RCAC module 160 determining the root cause of an issue in the network system 200 is a capacity and/or performance issue.

The BOMA module 180 preferably sends any new network topology information that will be implemented in data centers to a data center facility via, for example, a DC management system 580 (FIG. 2) and also preferably sends a bill of materials to an ordering system 590 (FIG. 2) for materials that are not already in inventory.

Figure 5:
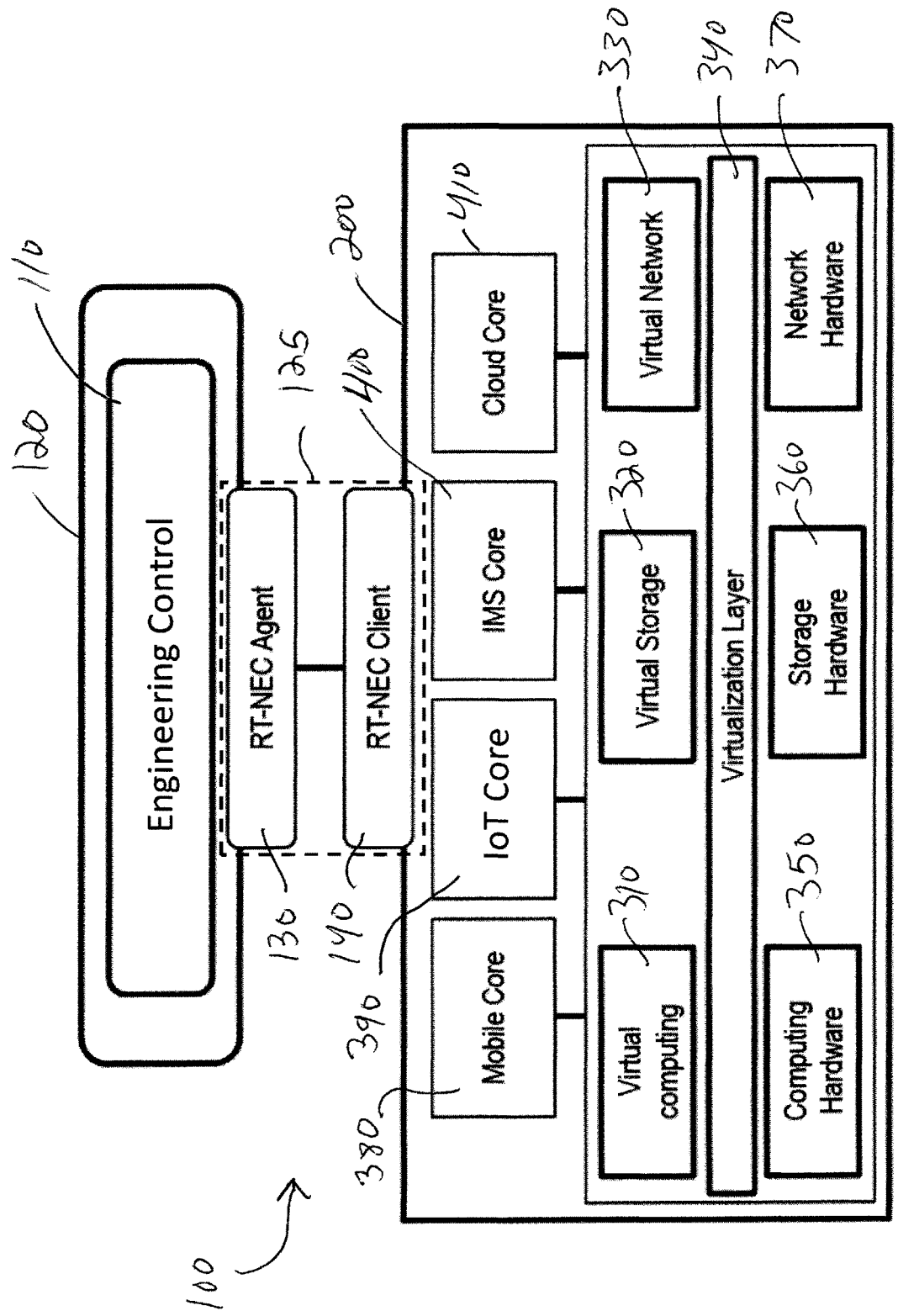
FIG. 5 is block diagram showing how the RT-NEC system can interact with a network system that includes a virtual network, in accordance with an exemplary embodiment of the present invention.

As discussed above, the RT-NEC system 100 of the present invention can interact with any type of network element including, but not limited to, IP routers, radio networks, radio core networks, element management systems, network management systems and virtual systems. For example, FIG. 5 is block diagram showing how the RT-NEC system 100 can interact with a network system 200 that includes a virtual network 300. The virtual network 300 can include a virtual computing module 310, a virtual storage module 320 and a virtual network module 330 that connects, via a virtualization layer 340, with computing hardware 350, storage hardware 360 and network hardware 370.

The network system 200 of FIG. 4 also includes a mobile core module 380, an Internet of Things ("IoT") core module 390, an IP multimedia subsystem ("IMS") core module 400 and a cloud core module 410. The mobile core module 380 handles services such as call/data routing, subscriber data management and security information. The IoT module 390 connects different devices with different service capabilities. The IMS core module 400 is a solution that provides multimedia call control and routing capabilities. The cloud core module 410 is a solution that provides cloud services such as infrastructure as a service, Software as Service, etc.

Figure 6:
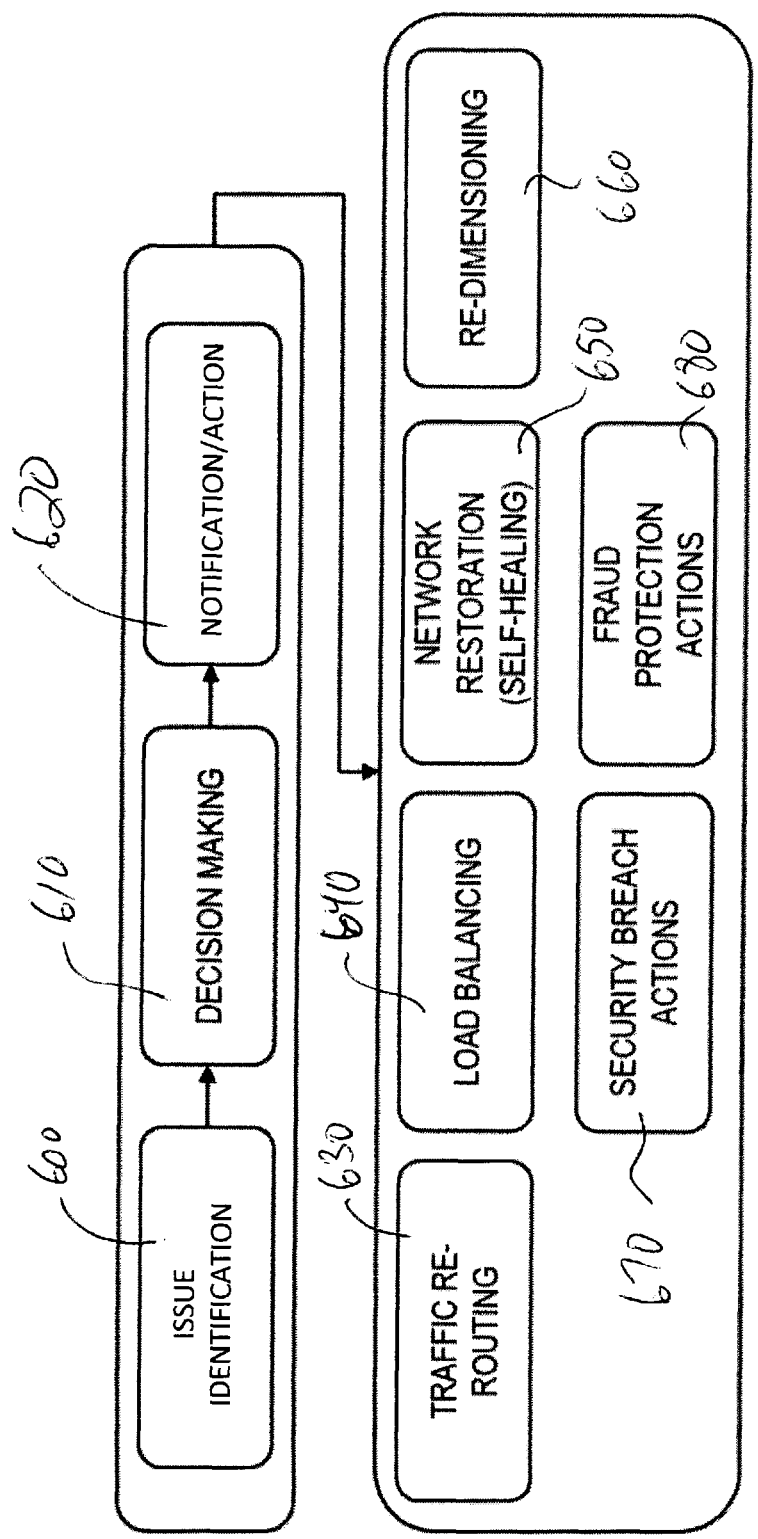
FIG. 6 is a flowchart describing the functionality of the E-RCAC module, in accordance with an exemplary embodiment of the present invention.

FIG. 6 is a flowchart describing the functionality of the E-RCAC module 160, in accordance with an exemplary embodiment of the present invention. At step 600, the E-RCAC module 160 conducts an automatic root cause analysis based on the information provided by the E-PC module 150 (the information provided by the E-PC module 150 is based on an analysis of the received structured data by the E-PC module 150) in order to try to identify the root cause of any issues with the network system 200.

At step 610, the E-RCAC module 160 decides whether it needs to request additional information in order to identify the root cause of an issue. If additional information is needed, the E-RCAC module 160 attempts to obtain the information by interacting with external systems 510A, 510B and/or interacting with network system 200.

If the root cause of an issue is identified, then at step 620 the E-RCAC module 160 sends notifications regarding the root cause of the issue to the appropriate externals systems 510A, 510B for addressing the issue. The available actions for addressing the issue can include, for example, traffic re-routing at step 630, load balancing at step 640, network restoration at step 650, re-dimensioning of the network at step 660, actions for addressing a security breach at step 670 and actions related to fraud protection at step 680.

For example, if the E-RCAC module 160 determines that the network requires re-dimensioning, the E-RCAC module 160 notifies the REC module 170 for automatic resource dimensioning, and preferably also notifies one or more relevant engineering teams about the required re-dimensioning. If the E-RCAC module 160 determines that the issue is a temporary overload, the E-RCAC module 160 may request a re-routing function to re-route the traffic or request throttling of traffic via, for example, a congestion control system 540 (FIG. 2). If the E-RCAC module 160 identifies issues requiring a restart, the E-RCAC module 160 may send a request for a self-healing function to restart the system via, for example, a self-healing system 520.

Figure 7:
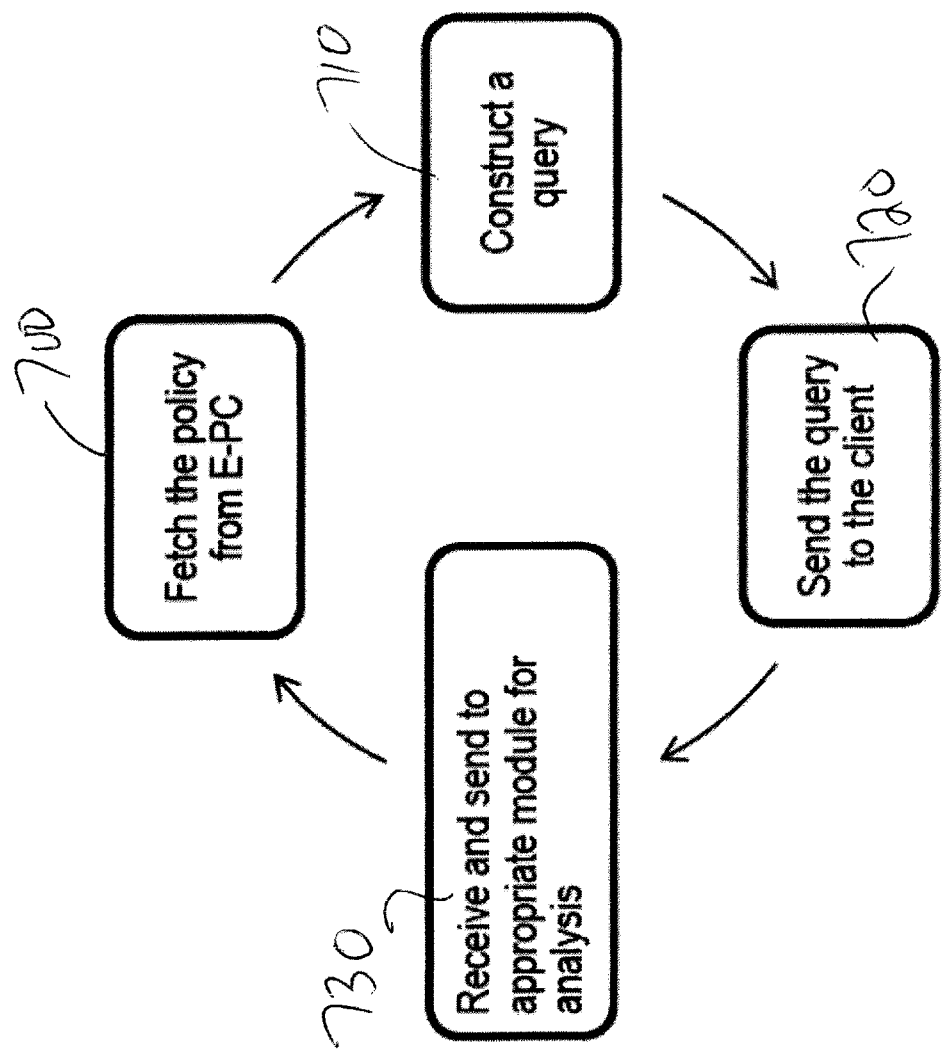
FIG. 7 is a flowchart describing the functionality of the RT-NEC agent module, in accordance with an exemplary embodiment of the present invention.

FIG. 7 is a flowchart describing the functionality of the RT-NEC agent module 130, in accordance with an exemplary embodiment of the present invention. As discussed above, the role of the RT-NEC agent module 130 is to construct queries based on pre-defined service policies (such as the service policy examples shown in FIG. 4), and to send the queries at predetermined and configurable time intervals to appropriate RC-NEC client modules 140.

At step 700, the RT-NEC agent module 130 fetches one or more service policies from the E-PC module 150. At step 710, the RT-NEC agent module 130 constructs one or more queries based on the fetched service policies. At step 720, the RT-NEC agent module 130 sends the one or more queries to the appropriate RT-NEC client module(s) 140. At step 730, the RT-NEC agent module 130 receives data related to the queries from the RT-NEC client module(s) 140 and sends the received data to the appropriate module (e.g., E-RCAC module 160) for analysis.

Figure 8:
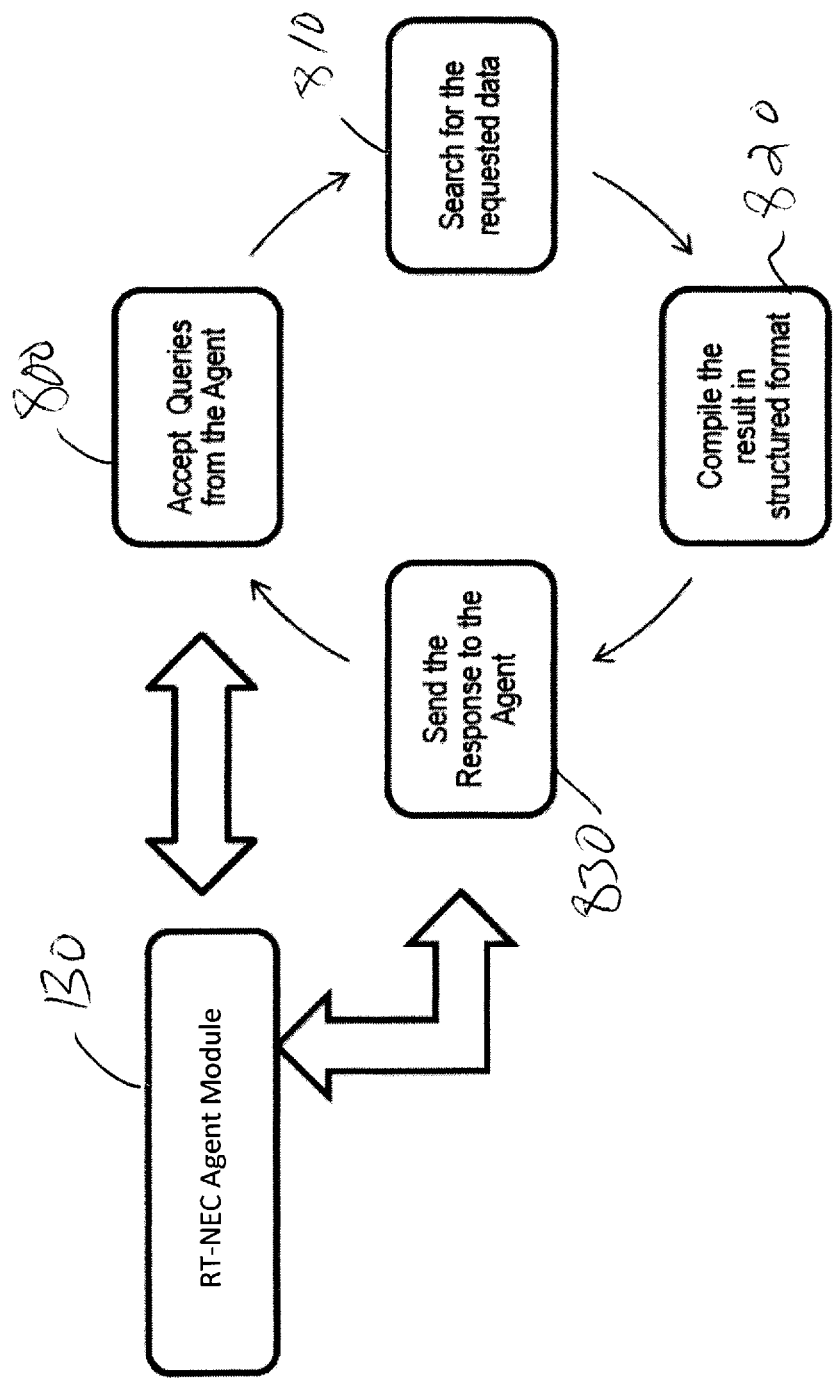
FIG. 8 is a flowchart describing the functionality of the RT-NEC client module 140, in accordance with an exemplary embodiment of the present invention.

FIG. 8 is a flowchart describing the functionality of the RT-NEC client module 140, in accordance with an exemplary embodiment of the present invention. As discussed above, the role of the RT-NEC client module 140 is to search an unstructured network database for the data requested by the RT-NEC agent module 130, and compile the relevant data in a structured format and send the relevant data back to the RT-NEC agent module 130.

At step 800, the RT-NEC client module 140 accepts a query from the RT-NEC agent module 130. At step 810, the RT-NEC client module 140 searches for the requested data. At step 820, the RT-NEC client module 140 compiles the requested data in a structured format. At step 830, the RT-NEC client module 140 sends the compiled requested data to the RT-NEC agent module 130. The RT-NEC client module 140 preferably compiles and sends only the requested data in order to minimize the connectivity bandwidth needed between the server 120 and the network system 200, and to eliminate duplicate data storage.

Figure 9A:
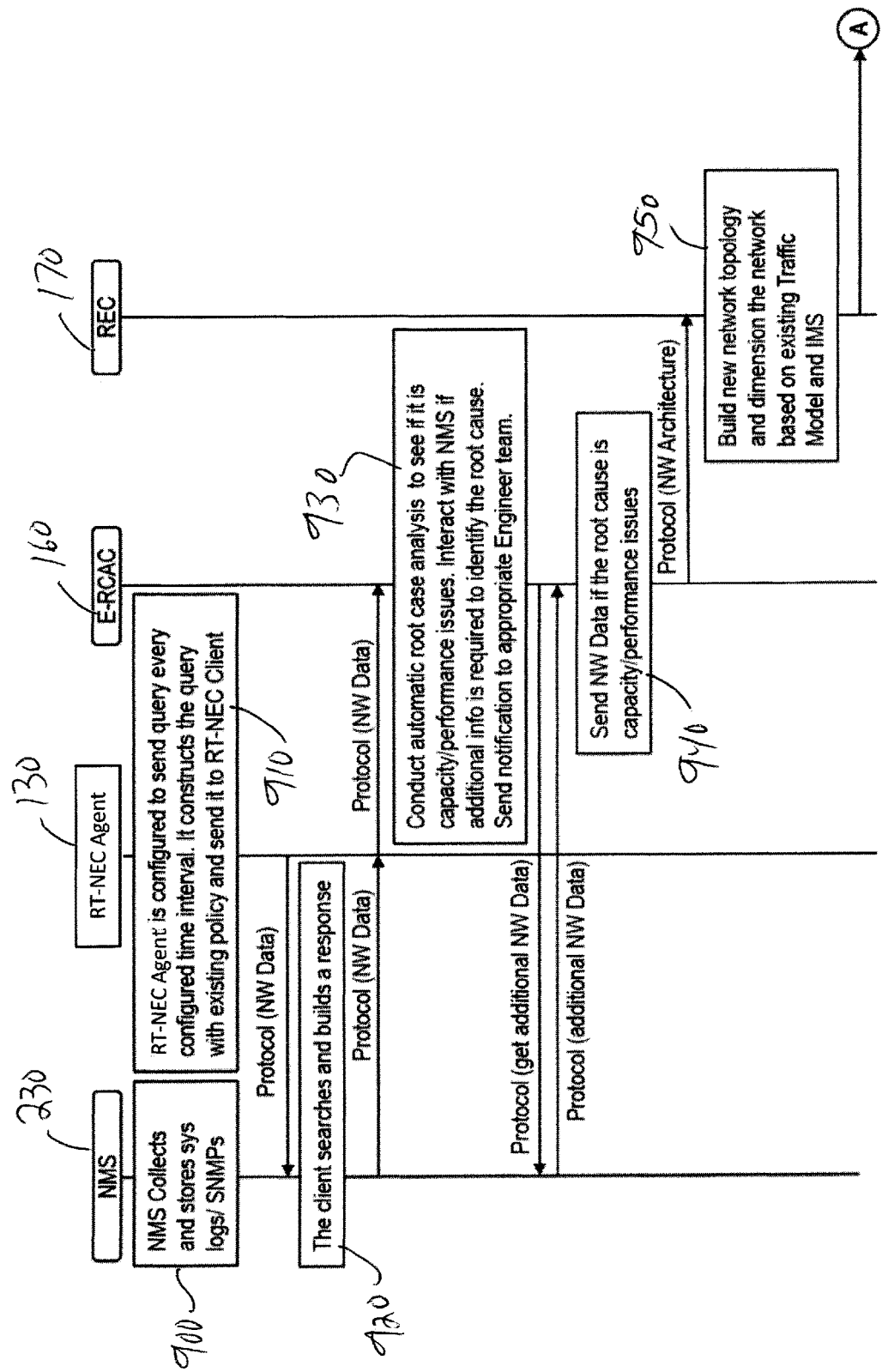
FIGS. 9A and 9B illustrate a state diagram of an example use case for a RT-NEC system, in accordance with an exemplary embodiment of the present invention.
Figure 9B:
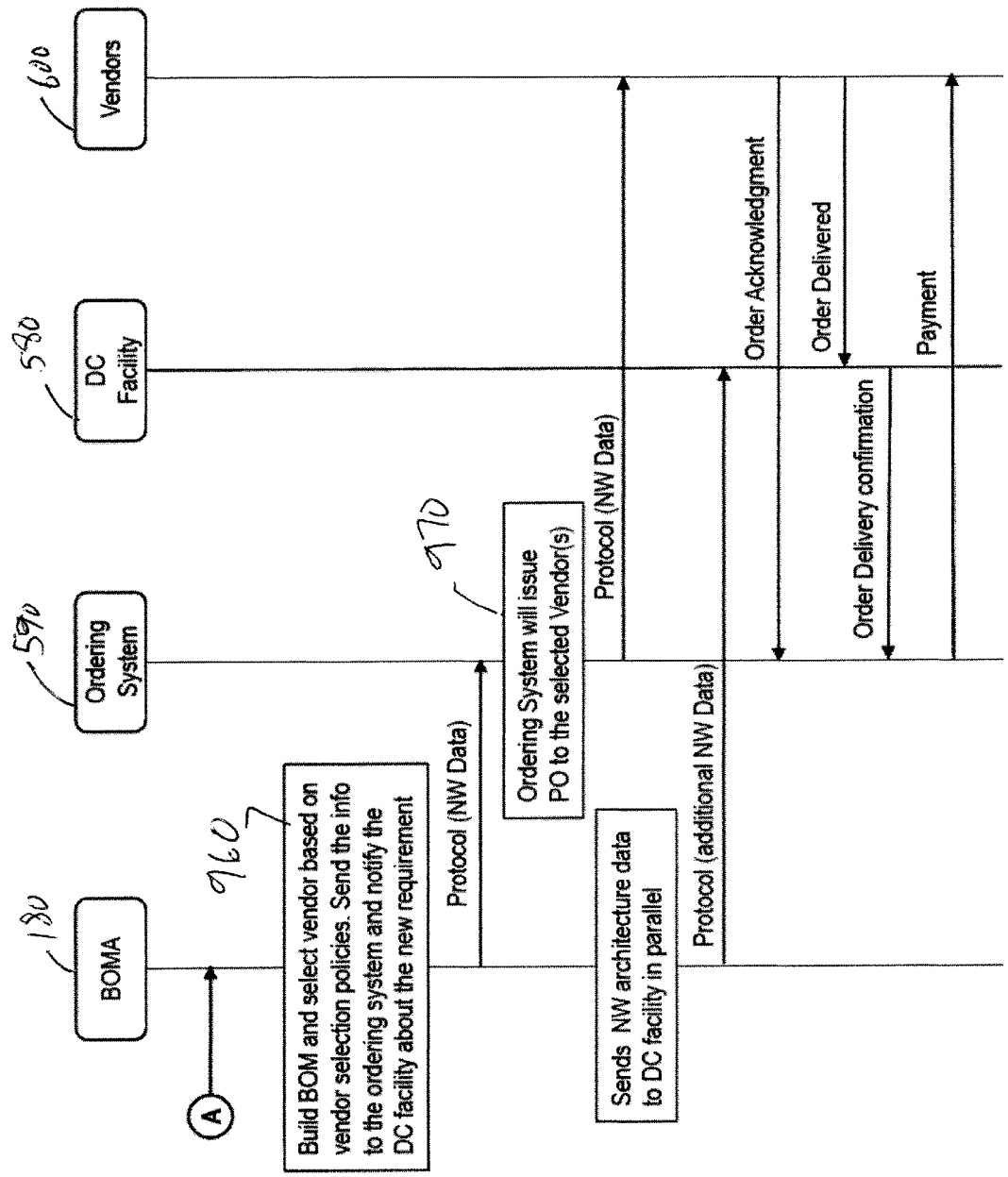

FIGS. 9A and 9B illustrate a state diagram of an example use case for the RT-NEC system 100 of FIG. 2, in accordance with an exemplary embodiment of the present invention. The NMS 230 collects and stores system logs and/or simple network management protocol (SNMP) logs (step 900). Either separately or at the same time, the RT-NEC agent module 130 is configured to send a query for NW data at predetermined time intervals to the NMS 230 at step 910. The RT-NEC agent module 130 constructs the query using an existing network service policy and sends the query to an RT-NEC client module 140 (not shown in FIGS. 9A and 9B).

The RT-NEC client module 140 performs a search based on the received query, builds a response and transmits the response to the E-RCAC module 160 via the RT-NEC agent module 130 (step 920). The E-RCAC module 160 conducts an automatic root case analysis to determine if the network has capacity and/or performance issues (step 930). The E-RCAC module 160 may interact further with the NMS 230 if additional information (additional NW data) is required to identify a root cause, and the NMS 230 may send additional NW data back to the E-RCAC module 160 for review.

If it is determined by the E-RCAC module 160 that the root cause is a capacity and/or a performance issue, the E-RCAC module may send network architecture information ("NW architecture") to the REC module 170 (step 940) which, in response, builds a new network topology and dimensions the network based on an existing traffic model and the inventory management system 220 (step 950).

The state diagram continues in FIG. 9B, which indicates that the REC module 170 sends information regarding the new topology and dimensions to the BOMA module 180 in order for the BOMA module 180 to build a bill of materials ("BOM") and select a vendor based on vendor selection policies (step 960). The BOMA module 180 then sends BOM and vendor selection information (NW Data) to the ordering system 590 and preferably also notifies the DC facility about the new requirement (additional NW data) in parallel (step 960).

In response, the ordering system 590 issues a purchase order (PO) to the selected vendor 600 (step 970), and the selected vendor 600 sends the ordering system 590 an order acknowledgement. The selected vendor 600 thereafter informs the DC facility 580 when the order has been delivered (order delivered). The DC facility 580 then sends an order delivery confirmation to the ordering system 590. In response, the ordering system 590 issues payment to the selected vendor 600.

Some of the advantages of the RT-NEC system 100 of the present invention include its modularity and the use of application programming interface (API) interactions. The interactions between the RT-NEC agent 130 and the RT-NEC client provides a real-time network engineering decision making mechanism that may monitor all network components and service resource utilization. The RT-NEC system 100 provides for efficient data query and response mechanisms that minimize the bandwidth required between different data sources, minimize duplicate data storage requirements and provides fast conversion of unstructured data into structured data. Furthermore, server and client agents may reside on any network component and in various types of external networks, such as cloud networks, virtualized networks, internet of things networks, mobile networks and fixed networks.

The foregoing embodiments and advantages are merely exemplary, and are not to be construed as limiting the present invention. The description of the present invention is intended to be illustrative, and not to limit the scope of the claims. Many alternatives, modifications, and variations will be apparent to those skilled in the art. Various changes may be made without departing from the spirit and scope of the invention.

What is claimed is:

1. An apparatus for identifying and correcting root causes of issues in a network system, the apparatus comprising:
an agent module implemented using hardware, the hardware comprising a first processor, and the agent module comprising a first set of computer readable instructions that are executable by the first processor to generate a network data query and send the network data query to the network system;
a client module implemented using further hardware, the further hardware comprising a second processor that is associated with the network system, and the client module comprising a second set of computer readable instructions that are executable by the second processor to:
receive the network data query from the agent module,
network data requested by the network data query from the network system,
organize the retrieved network data into a predetermined format to yield structured network data, and
send the structured network data to the agent module;
at least one engineering control module comprising a set of computer readable instructions executable by the first processor to:
receive the structured network data from the agent module,
analyze the structured network data, and
generate a response based on the analysis of the structure network data;
wherein the at least one engineering control module comprises:
an engineering root cause analysis control ("E-RCAC") module comprising a set of computer readable instructions executable by the first processor to:
analyze the structured network data to determine a root cause of one or more issues in the network system, and
communicate with external systems to address the root cause of the one or more issues in the network system;
an engineering policy control module comprising a set of computer readable instructions that are executable by the first processor to:
maintain and validate network service policies and dimensioning policies that apply to the network system,
provide configurable time intervals for sending data queries via the agent module,
receive the structured network data from the agent module,
evaluate the structured network data received from the agent module, and
send the results of the evaluation of the structured data to the E-RCAC module;
a resource engineering control module comprising a set of computer readable instructions that are executable by the first processor to maintain and provide dimensioning and architecture information for the network system; and
a bill of materials analytics module comprising a set of computer readable instructions that are executable by the first processor to maintain bill of materials information for the network system.

2. The apparatus of claim 1, wherein the first processor is located at a server.

3. The apparatus of claim 1, wherein the network system comprises a network element, and wherein the second processor is located at the network element.

4. The apparatus of claim 3, wherein the network system further comprises:
an inventory management system comprising a database that stores network asset information and network information;
a network management system for performance monitoring and network quality analysis; and
an element management system for network element and node performance monitoring.

5. The apparatus of claim 3, wherein the network element comprises at least one of a router, a radio network, or a radio core network.

6. The apparatus of claim 1, wherein the agent module generates the network data query based on predetermined engineering and dimensioning rules.

7. The apparatus of claim 1, wherein the E-RCAC module further comprises a set of computer readable instructions executable by the first processor to request additional information from the network system to determine the root cause of the one or more issues in the network system.

8. The apparatus of claim 1, wherein the data requested by the network data query comprises memory utilization data and CPU utilization data.

9. The apparatus of claim 1, wherein the bill of materials analytics module further comprises a set of computer readable instructions that are executable by the first processor to:
maintain a list of materials and/or equipment used to implement and maintain the network system;
maintain a list of preferred vendors for the materials and/or equipment used to implement and maintain the network system; and
maintain records regarding locations of the materials and/or equipment used to implement and maintain the network system.

10. The apparatus of claim 1, wherein the network system comprises at least one of a cloud-based network, a virtualized network, an Internet-of-Things network, a mobile device network or a fixed device network.

11. The apparatus of claim 1, wherein the resource engineering control module further comprises a set of computer readable instructions that are executable by the first processor to:
generate and maintain a network traffic model for the network system;
dimension parameters for the network system;
maintain topology information for the network system;
generate proposals for network architectures; and
provide notifications to data centers.

12. An apparatus for identifying and correcting root causes of issues in a network system, the apparatus comprising:
an agent module implemented using hardware, the hardware comprising a first processor, and the agent module comprising a first set of computer readable instructions that are executable by the first processor to generate a network data query and send the network data query to the network system;
a client module implemented using further hardware, the further hardware comprising a second processor that is associated with the network system, and the client module comprising a second set of computer readable instructions that are executable by the second processor to:

receive the network data query from the agent module,
retrieve network data requested by the network data query from the network system,
organize the retrieved network data into a predetermined format to yield structured network data, and
send the structured network data to the agent module;

an engineering root cause analysis control ("E-RCAC") module, wherein the E-RCAC module comprises a set of computer readable instructions executable by the first processor to:
analyze the structured network data to determine a root cause of one or more issues in the network system, and
communicate with external systems to address the root cause of the one or more issues in the network system;

an engineering policy control module comprising a set of computer readable instructions that are executable by the first processor to:
maintain and validate network service policies and dimensioning policies that apply to the network system,
provide configurable time intervals for sending data queries via the agent module,
receive the structured network data from the agent module,
evaluate the structured network data received from the agent module, and
send the results of the evaluation of the structured data to the E-RCAC module;

a resource engineering control module comprising a set of computer readable instructions that are executable by the first processor to maintain and provide dimensioning and architecture information for the network system; and a bill of materials analytics module comprising a set of computer readable instructions that are executable by the first processor to maintain bill of materials information for the network system.

13. The apparatus of claim 12, wherein the first processor is located at a server.

14. The apparatus of claim 12, wherein the network system comprises a network element, and wherein the second processor is located at the network element.

15. The apparatus of claim 12, wherein the agent module generates the network data query based on predetermined engineering and dimensioning rules.

16. The apparatus of claim 12, wherein the bill of materials analytics module further comprises a set of computer readable instructions that are executable by the first processor to:
maintain a list of materials and/or equipment used to implement and maintain the network system;
maintain a list of preferred vendors for the materials and/or equipment used to implement and maintain the network system; and
maintain records regarding locations of the materials and/or equipment used to implement and maintain the network system.

17. The apparatus of claim 12, wherein the network system comprises at least one of a cloud-based network, a virtualized network, an Internet-of-Things network, a mobile device network or a fixed device network.

18. The apparatus of claim 12, wherein the resource engineering control module further comprises a set of computer readable instructions that are executable by the first processor to:
generate and maintain a network traffic model for the network system;
dimension parameters for the network system;
maintain topology information for the network system;
generate proposals for network architectures; and
provide notifications to data centers.

* * * * *